United States Patent [19]
Burwell

[11] Patent Number: 6,098,810
[45] Date of Patent: *Aug. 8, 2000

[54] FLOTATION PROCESS FOR SEPARATING SILICA FROM FELDSPAR TO FORM A FEED MATERIAL FOR MAKING GLASS

[75] Inventor: Blair Burwell, Rifle, Colo.

[73] Assignee: Pueblo Process, LLC, Denver, Colo.

[*] Notice: This patent issued on a continued prosecution application filed under 37 CFR 1.53(d), and is subject to the twenty year patent term provisions of 35 U.S.C. 154(a)(2).

[21] Appl. No.: 09/105,608

[22] Filed: Jun. 26, 1998

[51] Int. Cl.$^7$ ................................ B03D 1/14; B03B 5/60
[52] U.S. Cl. .......................... 209/167; 209/166; 209/162; 209/232
[58] Field of Search ..................... 209/166, 167, 209/3, 4, 7, 212, 213, 214, 231, 232

[56] References Cited

U.S. PATENT DOCUMENTS

| | | | |
|---|---|---|---|
| 2,878,102 | 3/1959 | Sternfels . | |
| 3,575,293 | 4/1971 | Nelson | 209/458 |
| 3,595,390 | 7/1971 | Booth | 209/166 |
| 3,656,935 | 4/1972 | Iwasaki | 75/82 |
| 3,701,419 | 10/1972 | Hutter et al. | 209/111.8 |
| 3,720,312 | 3/1973 | Shook et al. | 209/130 |
| 3,811,623 | 5/1974 | Speer | 241/1 |
| 3,844,939 | 10/1974 | Katayanagi | 209/166 |
| 3,914,385 | 10/1975 | Slade | 423/340 |
| 3,929,627 | 12/1975 | Frangiskos et al. | 209/9 |
| 3,973,734 | 8/1976 | Rosar et al. | 241/20 |
| 4,017,385 | 4/1977 | Morton et al. | 209/214 |
| 4,023,959 | 5/1977 | Nilsen | 75/1 R |
| 4,087,004 | 5/1978 | Nott et al. | 209/9 |
| 4,122,004 | 10/1978 | Harris | 209/166 |
| 4,125,460 | 11/1978 | Nott et al. | 209/8 |
| 4,130,477 | 12/1978 | Podobnik et al. | 209/166 |
| 4,190,524 | 2/1980 | Watson | 209/213 |
| 4,192,738 | 3/1980 | Colombo et al. | 209/166 |
| 4,205,979 | 6/1980 | Kindig et al. | 75/1 R |
| 4,218,310 | 8/1980 | Morey | 209/223 |
| 4,239,529 | 12/1980 | Kindig et al. | 75/1 R |
| 4,239,619 | 12/1980 | Aplan et al. | 209/214 |
| 4,257,881 | 3/1981 | Kindig et al. | 75/1 R |
| 4,283,017 | 8/1981 | Coale et al. | 241/24 |
| 4,388,179 | 6/1983 | Lewis | 208/177 |
| 4,511,540 | 4/1985 | Crussard et al. | 423/26 |
| 4,611,951 | 9/1986 | Sapp | 210/747 |
| 4,626,268 | 12/1986 | Lindemann | 65/134 |
| 4,661,118 | 4/1987 | Thorpe et al. | 44/1 SR |
| 4,661,137 | 4/1987 | Garnier et al. | 65/21.4 |
| 4,725,351 | 2/1988 | Mehrotra | 209/166 |
| 4,804,422 | 2/1989 | Papanikolau et al. | 134/28 |
| 4,818,510 | 4/1989 | Jung | 423/335 |
| 4,882,043 | 11/1989 | Jung | 209/212 |
| 4,941,969 | 7/1990 | Schönert et al. | 209/39 |
| 4,983,370 | 1/1991 | Loritsch et al. | 423/340 |
| 5,011,666 | 4/1991 | Chao et al. | 423/82 |
| 5,017,283 | 5/1991 | Oder | 209/212 |
| 5,035,365 | 7/1991 | Birmingham | 241/14 |
| 5,037,625 | 8/1991 | Loritsch et al. | 423/340 |
| 5,053,119 | 10/1991 | Collins et al. | 209/166 |

(List continued on next page.)

OTHER PUBLICATIONS

Inprosys International Process Systems, Inc.; "High–force® Magnetic Separators" Oct. 19, 1995.

*Primary Examiner*—Donald P. Walsh
*Assistant Examiner*—Daniel K Schlak
*Attorney, Agent, or Firm*—Sheridan Ross P.C.

[57] ABSTRACT

A separation process is provided for treating a feed material comprising silica, feldspar, and metal impurities, including at least one of mica, iron impurities, or refractory heavy minerals, to form one or more products for use in making glass. In the process, the feed material is floated in the presence of a depressant to inhibit the flotation of feldspar and thereby form a concentrate containing at least most of the silica and a tailings fraction containing at least most of the feldspar. The concentrate and tailings fractions can be converted into the products by magnetically removing the metal impurities therefrom.

30 Claims, 3 Drawing Sheets

U.S. PATENT DOCUMENTS

| | | | |
|---|---|---|---|
| 5,124,028 | 6/1992 | Klimpel | 209/166 |
| 5,143,599 | 9/1992 | Derdall et al. | 209/166 |
| 5,180,511 | 1/1993 | Harrison | 209/166 |
| 5,182,014 | 1/1993 | Goodman | 209/164 |
| 5,312,602 | 5/1994 | Svensson et al. | 423/150.1 |
| 5,334,364 | 8/1994 | Aguirre-Villafana et al. | 423/340 |
| 5,411,148 | 5/1995 | Kelebek et al. | 209/166 |
| 5,453,408 | 9/1995 | Huard et al. | 501/122 |
| 5,496,526 | 3/1996 | Pojar et al. | 423/49 |
| 5,507,395 | 4/1996 | Wang et al. | 209/167 |
| 5,531,330 | 7/1996 | Nagaraj et al. | 209/167 |
| 5,879,542 | 3/1999 | Hoecker | 209/167 |

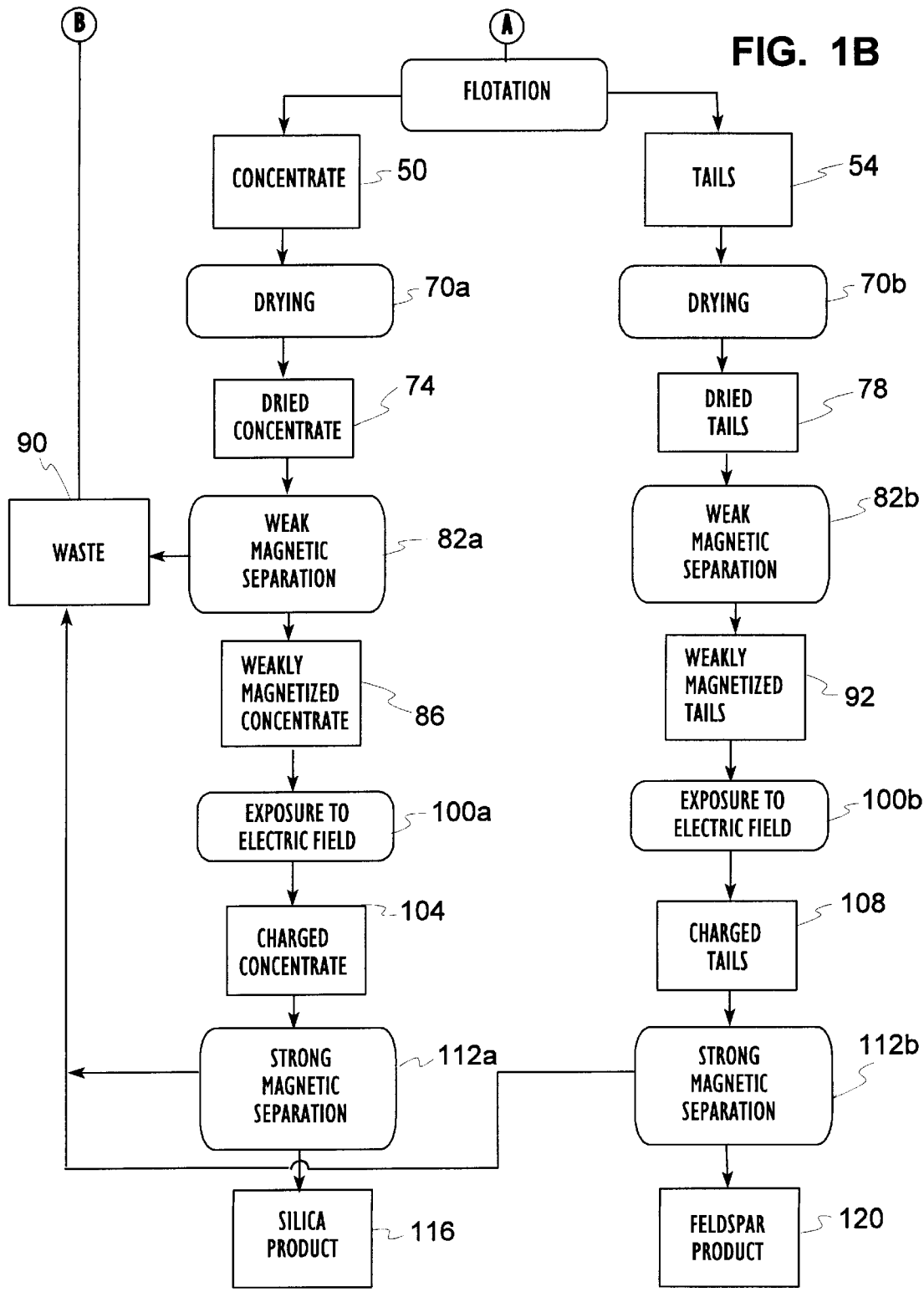

FLOTATION PROCESS FOR SEPARATING SILICA FROM FELDSPAR TO FORM A FEED MATERIAL FOR MAKING GLASS

FIELD OF THE INVENTION

The present invention relates generally to processes for producing feed materials for glassmaking and specifically to processes using magnetic separation and/or flotation for producing such feed materials.

BACKGROUND OF THE INVENTION

Glass is generally composed of inorganic oxides, and contains silicon dioxide ($SiO_2$), also known as silica, as the major constituent. Suitable feed materials for glassmaking include silica as the major component with feldspar as a minor component. Feldspar provides alumina which acts as a flux during glassmaking.

A flotation process is commonly used to produce a feldspar-containing concentrate from naturally-occurring deposits. The concentrate is shipped to the plant and blended with locally available silica to form the feed material. The flotation process generally includes the steps of crushing and grinding the material to a relatively small size, conditioning with a promoter, such as hydrofluoric acid, sulfuric acid, sodium fluoride, or hydrochloric acid, to provide a pH of pH 2 to pH 3 and floating the ground material in the presence of the promoter to form the feldspar-containing concentrate which is required to contain minimum amounts of mica, heavy minerals and iron-containing compounds, and a waste product (commonly referred to as "tailings"). As used herein, "iron impurities" are any inorganic or organic compounds that contain iron and are ferromagnetic or paramagnetic. Iron is detrimental to glassmaking because iron can discolor the glass. Heavy mineral impurities are any metal-containing compounds that have a melting point of more than about 2900° F. Heavy mineral impurities, particularly refractory heavy minerals (e.g., silliminite and kaynite) are not melted during the glass melting process and can become embedded in the finished glass as a solid inclusion or a "stone" defect. Exemplary heavy minerals include the sillimanite minerals (e.g., corundum, zircon, topaz, spinel, chromite, andalusite, cassiterite, and chrysoberyl).

The flotation techniques used to form the feldspar concentrate use expensive and environmentally hazardous reagents, such as hydrofluoric acid, sulfuric acid, or sodium fluoride. The use of these chemicals can add significantly to the cost of processing the raw material and can create problems in disposing of the water used in flotation. Some chemicals require a special tailings disposal method, thus adding to the overall cost of the glassmaking process.

Therefore, there is a need for an inexpensive method for forming a feed material for glassmaking.

There is a further need for a method for forming a feed material for glassmaking that does not require the use of hazardous chemicals.

SUMMARY OF THE INVENTION

These and other needs are addressed by the process of the present invention for treating a feed material comprising silica (e.g., in the form of chalcedony, chert, coesite, cristobalite, flint and quartz), feldspars (e.g., plagioclase and orthoclase feldspars), and heavy mineral impurities (e.g., mica, refractory heavy minerals and iron impurities) for use in making glass. As used herein, "silica" refers to silicate minerals in which each of the four oxygens in the silicate tetrahedron is shared with an adjacent tetrahedron (i.e., the formula $SiO_2$ results) and "feldspars" refers to silicate minerals in which $Al^{+3}$ is substituted for some of the $Si^{+4}$ ions in the silicate tetrahedron. Feldspars preferably include orthoclase, hyalophane, celsian, microcline, anorthoclase, and plagioclase feldspars. In the process, a slurry containing the feed material and an aluminosilicate depressant is subjected to flotation to form a concentrate fraction (that is removed in the froth from the top of the flotation cell) containing most of the silica in the feed material and a tailings fraction (that is removed in the underflow from the bottom of the flotation cell) containing most of the aluminosilicate in the feed material. The flotation process employs environmentally acceptable and inexpensive frothers, collectors, and feldspar depressants and thereby avoids the environmental problems associated with the promoters of the prior art.

The feldspar depressant is believed to render the feldspar substantially polar while the silica remains substantially nonpolar. The feldspar depressant preferably includes a metal that is selected from the group consisting of calcium, magnesium, barium, strontium, beryllium and mixtures thereof. More preferred depressants include lime (CaO), calcium hydroxide ($Ca(OH)_2$), gypsum ($CaSO_4$), and mixtures thereof.

The concentration of the feldspar depressant in the slurry is preferably sufficient to react with substantially all of the feldspar in the feed material. More preferably, the amount of the feldspar depressant that is contacted with the slurry is at least about 100% and more preferably at least about 150% of the amount that is theoretically required to react with all of the feldspar in the feed material. Commonly, this amount of feldspar depressant results in a depressant concentration ranging from about 0.10 to about 2 Kg/tonne and more commonly from about 0.25 to about 1 Kg/tonne.

The collector is any collector that assists in the flotation of silica. Preferred collectors include amines, with cationic amines being more preferred and amine acetates being most preferred. The preferred concentration of the collector in flotation preferably ranges from about 0.05 to about 0.20 Kg/tonne.

The frother can be any substance that assists in the formation of a froth in the flotation cell. Preferred frothers include long-chained alcohols, with methyl isobutyl carbinol being more preferred. The preferred concentration of the frother preferably ranges from about 0.1 to about 0.5 kg/tonne.

The pH of the slurry during flotation is an important factor to the effectiveness of the feldspar/silica separation. Preferably the pH of the slurry ranges from about pH 8.4 to about pH 9 and more preferably from about pH 8.5 to about pH 8.9.

As will be appreciated, the particle size of the feed material is an important consideration in flotation processes. Preferably, the $P_{80}$ size of the particles in the feed material ranges from about 50 mesh (U.S.) to about 100 mesh (U.S.).

Prior to flotation, the feed material is preferably scrubbed and/or deslimed to provide a scrubbed feed material and/or a deslimed feed material and a waste material (i.e., fine particles). Scrubbing and desliming remove finely sized particles (i.e., having a size smaller than about 150 mesh (U.S) which are present in the feed material.

After flotation, the concentrate and/or tailings fractions are dried and the dried material preferably subjected to a magnetic separation step to remove magnetic impurities such as magnetite, hematite, limonite, gaethite and other iron oxides, and form a magnetic concentrate and waste material. Magnetic separation can be performed using both a weak and a strong magnetic separation step. In the weak magnetic separation step, the magnetic field has a preferred strength of no more than about 8,000 gauss. In the strong magnetic separation step, the concentrate and/or tailings fraction is subjected to a magnetic field having a strength of at least about 18,000 gauss.

Magnetic concentration can be highly advantageous in removing magnetic impurities. For example, the magnetic concentrate typically contains no more than about 0.15 wt % iron impurities, no more than about 0.075 wt % heavy minerals, and no more than about 0.01 wt % mica. The waste material typically contains at least about 95% of the iron-containing compounds in the feed material, at least about 90% of the mica in the feed material, or at least about 99% of the heavy minerals in the feed material.

To improve the separation of magnetic impurities in the strong magnetic separation step, the magnetic concentrate from the weak magnetic separation step can be contacted with an electric (or electrostatic) field to facilitate removal of magnetic impurities from the weak magnetic concentrate. As will be appreciated, the electric field imparts additional electric charge to the refractory heavy minerals and iron-containing impurities which facilitates magnetic separation of the particles during strong magnetic separation.

BRIEF DESCRIPTION OF DRAWINGS

FIGS. 1A and 1B together present a flow chart which represents a process according to the present invention.

DETAILED DESCRIPTION

The present invention provides a process for treating a feed material comprising magnetic impurities (e.g., iron-containing compounds, refractory heavy metals and mica), silica, and feldspar. The process first separates silica from feldspars, preferably feldspar, in concentrate and tailings fractions, respectively, and subjects the concentrate and tailings fractions to magnetic separation to remove the magnetic impurities. As used herein, "magnetic impurities" refer to heavy minerals that demonstrate magnetic properties in the presence of a magnetic field.

A process configuration according to a preferred embodiment of the present invention is depicted in FIG. 1. This configuration is particularly useful for separating silica from feldspar in feldpathic sands. Although this configuration will be discussed with reference to feldspar, it should be appreciated that the process is applicable to the separation of silica from feldspars generally.

Figure 1A:
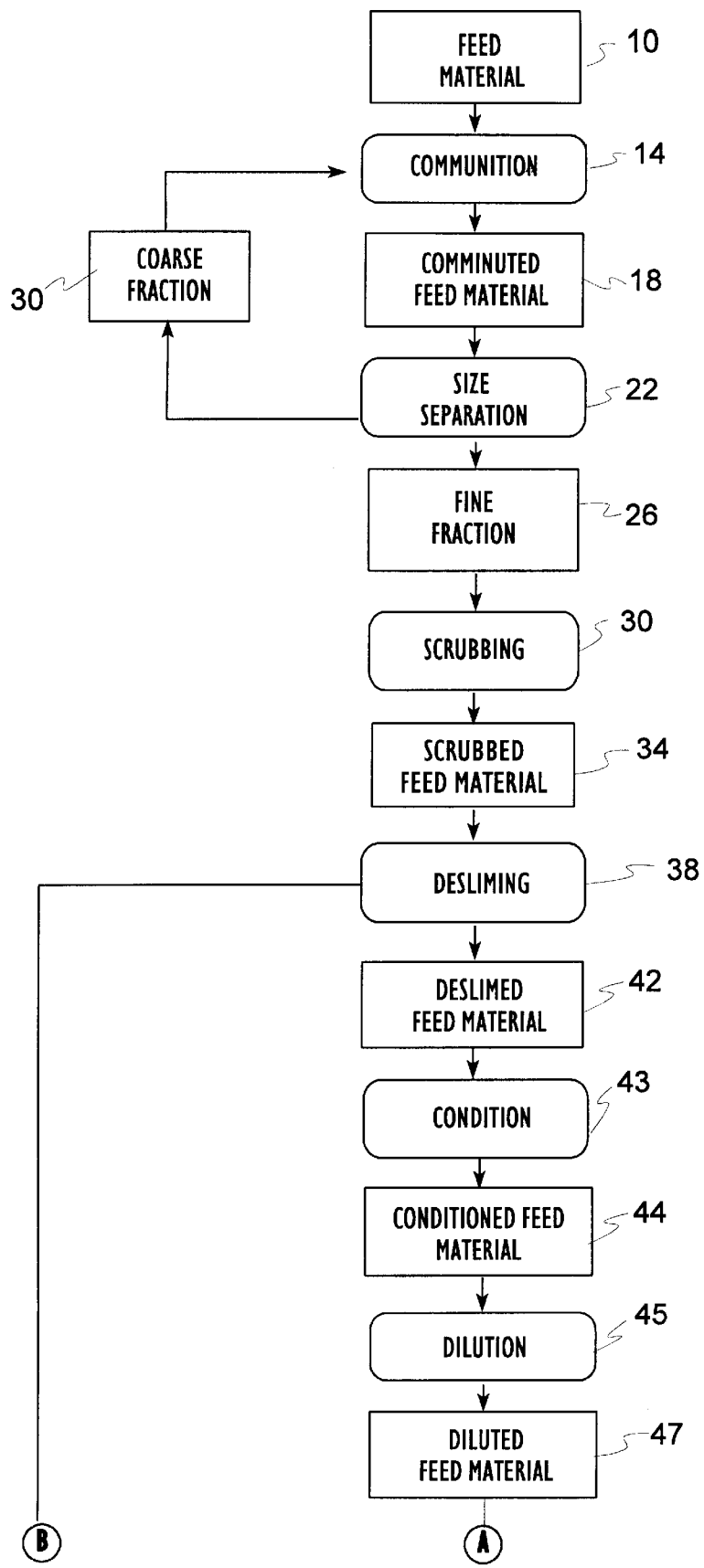

With reference to FIG 1A, a feed material 10, which commonly includes from about 40 to about 75 wt % silica, from about 3 to about 50 wt % feldspar, and from about 0.5 to about 3.0 wt % magnetic impurities, is comminuted 14 to form a comminuted feed material 18. Typically, when the particle size of the comminuted feed material 18 is plotted against the number of particles for each particle size, the graph substantially resembles a normal distribution bell curve. A peak grain size is defined as the particle size where the bell curve is at the maximum. Preferably, the peak grain size of the comminuted feed material 18 is from about 60 mesh (U.S.) to about 100 mesh (U.S.), more preferably from about 65 mesh (U.S.) to about 75 mesh (U.S.) and most preferably from about 70 mesh (U.S.) to about 80 mesh (U.S.).

Comminution 14 of the feed material 10 may be performed on a dry or wet feed material with a wet feed material being most preferred. Comminution 14 of the feed material 10 may be performed by any suitable method including grinding with a rod mill, hammer mill, Raymond mill, pin mill, ceramic tube type mill or ball mill. A screen (not shown) having an opening size of about 6.35 mm to about 4 mm can be used to separate large particles from the feed material 10 prior to comminution 14.

The comminuted feed material 18 is subjected to size separation step 22 to form fine and coarse fractions 26 and 30. Any of the known methods of size separation can be used (e.g., screens, gravity separation devices, and the like). the coarse fraction 30 is returned to the comminution step 14 for further size reduction.

The grain size of the fine fraction 26 can be expressed using a $P_{80}$ size. The $P_{80}$ size is a screen size at which 80% of the particles pass through the screen. Preferably, the $P_{80}$ size separated feed material 18 is from about 30 mesh (U.S.) to about 140 mesh (U.S.), more preferably from about 35 mesh (U.S.) to about 140 mesh (U.S.), and most preferably from about 40 mesh (U.S.) to about 100 mesh (U.S.).

The fine fraction 26 is subjected to a mechanical scrubbing step 30 to provide a scrubbed feed material 34. Scrubbing removes finely sized particles from the feed material. A typical scrubber contains rubber blades that rotate and propel particles, thereby causing interparticle collisions to occur. The collisions between particles loosen fine particles present on the surface of the particles.

The resulting scrubbed material 34 is subjected to a desliming step 38 to provide a deslimed feed material 42 and a waste material 90. Desliming can be done using any suitable desliming apparatus, including a hydro-classifier such as "FLOAT-TECH" manufactured by COPCO. Preferably, the waste material 90 from the scrubbing and desliming steps remove from about 3% to about 5% of the feed material in the fine fraction.

The deslimed feed material 42 is conditioned 43 to produce a conditioned feed material 44. During conditioning, the pH of the deslimed feed material 42 is raised by the addition of a suitable base, such as lime or a hydroxide. The preferred pH of the conditioned feed material 44 is at least about pH 8.2 and more preferably ranges from about pH 8.2 to about pH 9.

The conditioned feed material 44 is diluted 45 with water to form a diluted feed material 47 having a lower solids content for flotation. Preferably, the solids content of the diluted feed material 47 is lowered to no more than about 30% by volume and preferably to a level ranging from about 10 to about 20 % by volume.

After dilution is completed, the diluted feed material 47 is subjected to flotation 46 to produce the concentrate and tails fractions 50 and 54. In the flotation step, a feldspar depressant is used to depress flotation of the feldspar but not flotation of the silica. While not wishing to be bound by any theory, it is believed that the depressant reacts with the surface of the feldspar in such a manner that the feldspar surface is made substantially polar (i.e., hydrophilic) and reacts with the surface of the silica in such a manner that the silica surface is rendered more nonpolar (i.e., hydrophobic). The feldspar depressant is preferably a dissolved metal ion selected from the group consisting of calcium, magnesium, barium, strontium, beryllium and mixtures thereof with calcium being more preferred. The depressant is preferably added in the form of an oxide, such as calcium oxide (i.e., lime or calcium hydroxide or calcium sulfate). The concentration of the feldspar depressant in the slurry during flotation preferably ranges from about 0.10 to about 2 kg/tonne and more preferably from about 0.25 to about 1 kg/tonne.

The flotation is typically performed using a frother and a collector to enhance flotation of the silica. Suitable frothers include long-chained alcohols and suitable collectors include amines, with the water-soluble or water dispersible acetates of the free-base amines being more preferred. An especially preferred amine is A60 sold by NOTTINGHAM CHEMICAL COMPANY. The concentration of the frother in flotation commonly ranges from about 0.1 to about 0.5 kg/tonne, and the concentration of the collector commonly from about 0.05 to about 0.20 kg/tonne. Preferably the collector is added in stages during flotation to make the separation more effective. If too much of the collector is present in the diluted feed material 47 (i.e., a concentration of about 0.13 kg/tonne or more in some feed materials), both silica and feldspar can float and the separation can be largely ineffective.

The pH of the slurry containing the deslimed feed material is important to the effectiveness of the flotation. Preferably, the pH ranges from about pH 8.2 to about pH 9, more preferably from about pH 8.4 to about pH 9 and most preferably from about pH 8.5 to about pH 8.9. It is believed that the amine collector reacts in this pH range with hydroxyl ions present in the solution. The altered amine collector is believed to be more strongly attracted to the silica surface than the unaltered amine. It has been observed that flotation substantially ceases when the pH drops below or rises above this range.

Because the pH drops during flotation, it is typically necessary to add additional base (i.e., additional feldspar depressant) to maintain the pH in the desired range. During base addition, flotation is typically ceased to permit the pH to be raised rapidly to the desired level.

Figure 2:
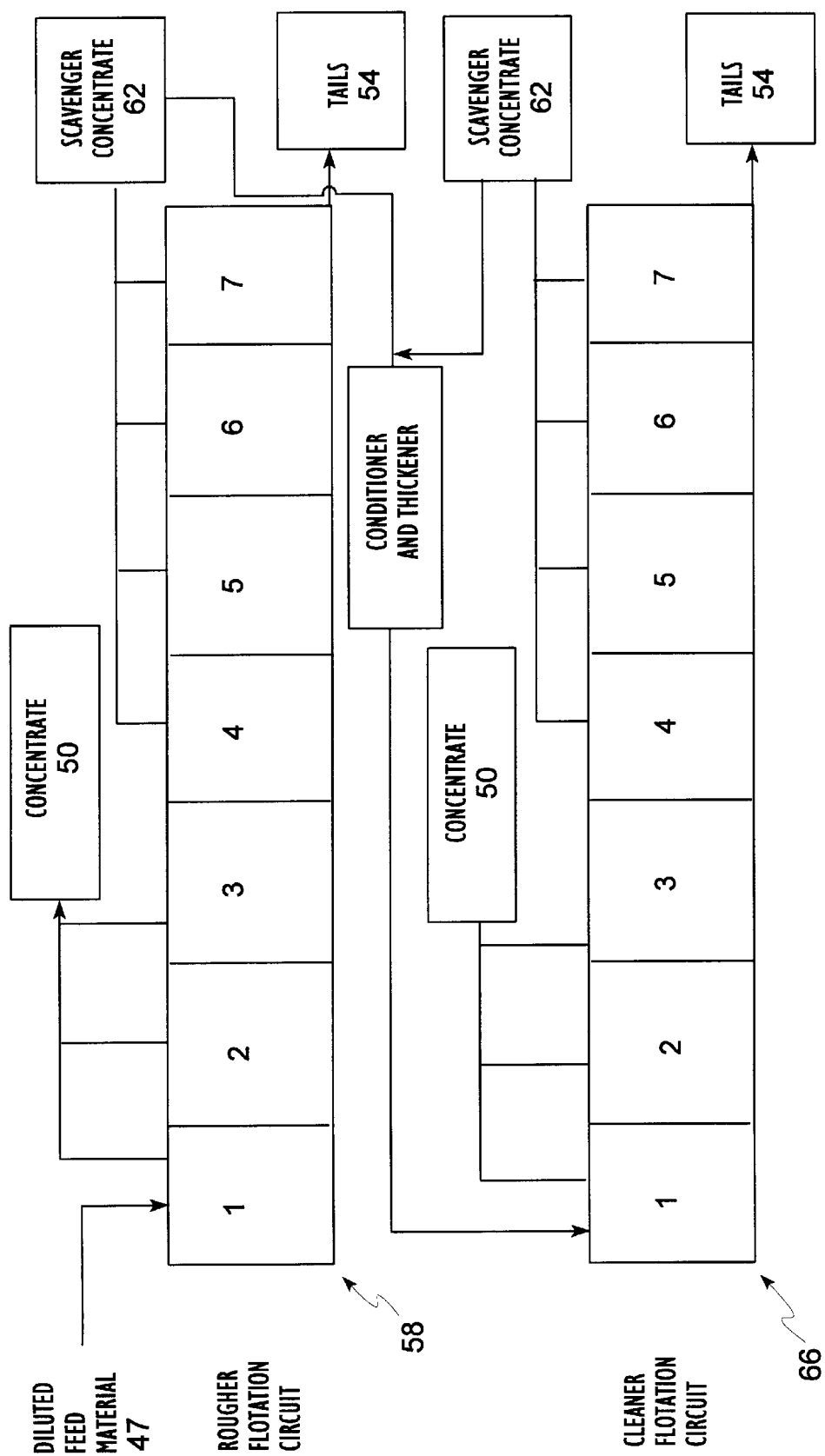
FIG. 2 depicts a flotation cell configuration that is useful in the flotation step.

FIG. 2 depicts a flotation cell configuration for the flotation step. In FIG. 2, the diluted feed material 47 is fed into the first flotation cell of the rougher flotation cell circuit 58. The concentrate from the first several cells in the circuit is removed to form a portion of the concentrate fraction 50. The concentrate from the remaining cells in the circuit is treated as a scavenger concentrate 62, and the nonfloated material in the bottom of the cells is removed to form a portion of the tailings fraction 54. The scavenger concentrate 62 is thickened and conditioned as noted above and thereafter diluted as noted above. The diluted scavenger concentrate 62 is then fed into the first cell of the cleaner flotation cell circuit 66. The concentrate from the first several cells in the circuit is removed to form another portion of the concentrate 50. The concentrate from the remaining downstream cells in the bank 66 is combined with the scavenger concentrate 62 and is returned to the first cell of the cleaner flotation cell circuit 66. The nonfloated material is removed from the flotation cells as another portion of the tailings fraction 54.

In an alternative embodiment, the deslimed feed material 42 (prior to the addition of the feldspar depressant), concentrate 50, and/or scavenger concentrate 62, and/or tails 54 can be contacted with sulfuric acid or another source of sulfate ion followed by the addition of calcium oxide or another source of calcium to form gypsum (calcium sulfate). Calcium sulfate has been found to have a dramatic effect on the flotation of feldspars such as feldspar. Separations of silica from feldspars are made considerably more selective when gypsum is present. In the case of the concentrate 50 and/or tails 54, the concentrate and/or tails 54 would be floated in a cleaner flotation circuit (not shown) to further clean up the concentrate 50, and tails 54 before the later magnetic separation steps.

In this embodiment, the amount of sulfuric acid or other source of sulfate ion that is contacted with the deslimed feed material, concentrate, scavenger concentrate, or tails is preferably sufficient to lower the pH to about pH 6 or less and more preferably to about pH 5 or less, while sufficient feldspar depressant is contacted with the deslimed feed material concentrate, scavenger concentrate or tails to raise the pH to at least about pH 8.7.

The separation of silica from feldspar in the flotation step is highly efficient. Commonly more than about 50% and more commonly at least about 90% of the silica in the diluted feed material 47 reports to the concentrate 50 and commonly less than about 50% and more commonly no more than about 10% reports to the tailings fraction 54. Typically more than about 50% and more typically at least about 75% of the feldspar in the diluted feed material 47 reports to the tailings fraction 54 and typically less than about 50% and more commonly no more than about 25% reports to the concentrate fraction 50.

Based on these percentages, the amount of silica and feldspar in the concentrate and tailings fractions, respectively, are relatively high. Preferably, the concentrate fraction contains no more than about 1.5 wt % and more preferably no more than about 0.5 wt % feldspar and at least about 75 wt %, more preferably at least about 80 wt %, and more preferably at least about 85 wt % silica. Preferably, the tailings fraction contains no more than about 20 wt % and more preferably no more than about 10 wt % silica with the remainder being feldspar.

Generally, a portion of the magnetic impurities is recovered in the concentrate fraction 50 and another portion of the magnetic impurities is recovered in the tailings fraction 54. At least most of these impurities are removed in one or more magnetic separation steps. As will be appreciated, magnetic separators separate paramagnetic from diamagnetic materials as paramagnetic materials reside on the magnet longer than diamagnetic materials.

Referring again to FIGS. 1A and 1B, before magnetic separation is performed the concentrate and tailings fractions 50 and 54 are dried 70$a,b$ to form a dried concentrate 74 and a dried tails 78. Drying can be performed using techniques known in the art, such as by passing the wet material through external heaters or by showering the wet material through hot gases.

The dried concentrate 74 and dried tails 78 are subjected to weak magnetic separation 82$a,b$ to form weakly magnetized concentrate and tails 86 and 92, respectively. The materials removed from the dried concentrate and tails by the relatively weak magnetic field separation 82 predominately comprise magnetite, hematite, and goethite. Preferably, the portion of the waste material 90 from the weak magnetic separation step 82 comprises at least about 10% of the magnetite, hematite and/or goethite in the dried concentrate and tails 74 and 78. Preferably, no more than about 90% of the magnetite, hematite, and/or goethite in the dried concentrate and tails is in the weakly magnetized concentrate and tails.

The removal of magnetite, hematite, and goethite using a relatively weak magnetic field separation 82 prevents excessive wear and tear on the strong magnetic field apparatus. The magnetic field can be generated by a permanent magnet or any other magnetic field generators such as electromagnetic generators. Preferably the relatively weak magnetic field is no more than about 15,000 gauss, more preferably from about 5,000 gauss to about 10,000 gauss, and most preferably from about 5,000 gauss to about 8,000 gauss.

In an optional step, the weakly magnetized concentrate and tails 86 and 92 are contacted 100$a,b$ with an electric field by suitable techniques to provide a charged concentrate 104 and a charged tails 108. It has been found that this exposure facilitates removal of heavy minerals via a strong magnetic field due to the electric charge imparted to the particles. Exposure to the electric field can be done using equipment such as a weak ionizer.

The charged concentrate and charged tails 104 and 108 are subjected to a strong magnetic field separation step 112a,b to produce the silica product 116 and the feldspar product 120 and a waste material 90 that comprises magnetic impurities, including iron-containing compounds, mica and/or refractory heavy minerals. The charged feed material 58 can be subjected to strong magnetic field separation 62 more than once until a desired amount of the magnetic impurities are removed from the charged concentrate and tails fractions 104 and 108. Preferably, the charged concentrate and tails are each passed through a strong magnetic field at least once, more preferably at least 2 times.

The strong magnetic field preferably has a minimum magnetic field strength of about 18,000 gauss and more preferably of about 20,000 gauss and a maximum magnetic field strength of about 50,000 gauss and more preferably of about 30,000 gauss. At such high magnetic field strengths, the magnetic separation step can effectively separate not only magnetic compounds but also paramagnetic compounds from diamagnetic compounds.

To achieve such a high magnetic field strength, a rare-earth magnet is preferred; however, other magnetic separators which can achieve a high magnetic field strength are also applicable for this invention. A variety of magnetic separator configurations such as roll-type, lift-type, cross-belt, belt, wet-drum, and the like can be employed to perform magnetic separation.

The silica and feldspar products 116 and 120 contain two or less, more preferably one or less and most preferably no refractory heavy minerals having a particle size of about 50 mesh (U.S.) or greater per 100 grams of the concentrated fraction. Heavy minerals have a chemical composition similar to that of non-refractory aluminum silicate minerals. Due to the crystal lattice and molecular structure of heavy minerals, heavy minerals have a higher specific gravity or density than non-refractory aluminum silicate minerals. This crystal lattice structure is believed to be the basis for the heavy minerals' ability to withstand the melting process in glassmaking.

As will be appreciated, the presence of iron impurities in the silica and feldspar products 116 and 120 also affects the quality of glass. The silica and feldspar products preferably comprise no more than about 1.5 wt % and more preferably no more than about 1.0 wt % paramagnetic and magnetic materials.

Mica is an undesirable paramagnetic component of the silica and feldspar products 116 and 120. The products preferably comprise no more then about 1 wt %.

The waste material 90 generated by the strong magnetic separation step 112 comprises substantially all of the paramagnetic and magnetic materials in the charged concentrate and charged tails 104 and 108. Although the amount of paramagnetic and magnetic impurities in the waste material 90 depends on the source of the feed material, preferably the waste material 90 comprises no more than about 0.1 wt % paramagnetics and no more than about 1 wt % magnetics. Preferably, the waste material contains at least about 75% and more preferably at least about 90% of the paramagnetic and magnetic impurities in the charged concentrate and tails 104 and 108.

The feldspar product preferably contains primarily feldspar and more preferably at least about 75 wt % feldspar. Preferably, at least about 75% of the feldspar in the fine fraction 26 is in the feldspar product 120. The silica product 116 preferably contains primarily silica and more preferably at least about 85 wt % and most preferably at least about 90 wt % silica. Preferably, at least about 90% of the silica in the fine fraction 26 is in the silica product 116.

Additional objects, advantages, and novel features of this invention will become apparent to those skilled in the art upon examination of the following examples, which are not intended to be limiting.

EXAMPLE 1

Initial test work was conducted on a feldspar raw material by conventional flotation methods. While the iron barely met the upper limits of the glass bottle specifications, the heavy minerals were higher than the specification.

The same feed material (the "bank run") in the size reduction step using a rod mill was ground to less than 40 mesh which resulted in 60% of the feldspar reporting in less than 140 mesh (tails or waste fraction). The tails assayed 35% higher than the head showing a concentration of the feldspar. Particles of 3 mesh or greater were screened out in the next grinding test which resulted in a recovery of 68% of the feldspar in a grade equal to the head assay. By proper screening and selective grinding a product of 80% of the feldspar with 35% higher grade is to be expected.

After selectively grinding, the test material was then passed through the high intensity rare earth magnetic fields with a finished material that assayed 0.06% $Fe_2O_3$ and a Heavy minerals count of one particle in 100 g. Further test work with induced ionization or electrostatics reduced the Heavy minerals count to zero.

EXAMPLE 2

A sample of sand from a deposit near Pueblo, Colorado, was dried overnight at a temperature of less than 100° C., and representative samples were then split for subsequent study. A head sample was removed by splitting and its chemical analysis by X-Ray fluorescence (XRF) methods is shown in Tables 1A and 1B as Sample Number 1.

TABLE 1A

| | WT % | | | | | | | | | | | | |
|---|---|---|---|---|---|---|---|---|---|---|---|---|---|
| SAMPLE | $Na_2O$ | MgO | $Al_2O_3$ | $SiO_2$ | $P_2O_5$ | S | Cl | $K_2O$ | CaO | $TiO_2$ | MnO | $Fe_2O_3$ | BaO |
| 1 | 1.33 | 0.29 | 8.93 | 82.7 | <0.05 | <0.05 | <0.02 | 4.49 | 0.26 | 0.17 | 0.02 | 1.44 | 0.10 |

TABLE 1B

| | PPM | | | | | | | | | | | | | | |
|---|---|---|---|---|---|---|---|---|---|---|---|---|---|---|---|
| SAMPLE | V | Cr | Ni | Cu | Zn | As | Sn | Pb | Mo | Sr | U | Th | Nb | Zr | Rb | Y |
| 1 | <10 | <10 | <10 | <10 | 27 | 24 | <50 | 15 | <10 | 110 | 18 | 13 | 21 | 332 | 120 | 43 |

A 1,500 g portion of the material was rod mill ground at 50 % solids for 9.5 minutes and screened at 30 mesh. The minus 30 mesh material was deslimed at 140 mesh. The plus 140 mesh fraction was attrition scrubbed at 72 % solids for six minutes, diluted with water, and deslimed at 140 mesh again. The minus 30 plus 140 mesh attrition scrubbed material was then filtered and split in half for feed to the two froth flotation tests. The XRF analysis of +30 mesh from grinding, attrition scrubbed −140 mesh and grinding slime −140 mesh are shown in Tables 2A and 2B as sample numbers 6, 7 and 8, respectively.

dard feldspar flotation procedure (standard reagent schedule from P. W. Gillibrand operations) on the yield and grade of feldspar and sand from the sample. One of the minus 30 plus 140 mesh fractions was conditioned with caustic and fatty acid collector, and the iron minerals were removed by froth flotation. The machine discharge product was densified and conditioned with amine and hydrofluoric acid, and the feldspar mineral was removed by froth flotation. All the products from the froth flotation test were collected, filtered, dried, and weighed, and a portion was removed by riffle splitting. The Feldspar Froth Product was subsequently

TABLE 2A

| | WT % | | | | | | | | | | | | |
|---|---|---|---|---|---|---|---|---|---|---|---|---|---|
| SAMPLE | Na$_2$O | MgO | Al$_2$O$_3$ | SiO$_2$ | P$_2$O$_5$ | S | Cl | K$_2$O | CaO | TiO$_2$ | MnO | Fe$_2$O$_3$ | BaO |
| 6 | 0.78 | <0.05 | 4.42 | 92.0 | <0.05 | <0.05 | <0.02 | 2.46 | 0.07 | 0.02 | <0.01 | 0.12 | 0.06 |
| 7 | 1.92 | 0.58 | 12.3 | 75.4 | <0.05 | <0.05 | <0.02 | 5.23 | 0.53 | 0.26 | 0.05 | 2.57 | 0.14 |
| 8 | 0.89 | 1.01 | 13.2 | 59.9 | 0.07 | <0.05 | <0.02 | 3.60 | 0.86 | 0.33 | 0.09 | 8.32 | 0.10 |

TABLE 2B

| | PPM | | | | | | | | | | | | | | |
|---|---|---|---|---|---|---|---|---|---|---|---|---|---|---|---|
| SAMPLE | V | Cr | Ni | Cu | Zn | As | Sn | Pb | Mo | Sr | U | Th | Nb | Zr | Rb | Y |
| 6 | <10 | <10 | <10 | <10 | <10 | <20 | <50 | <10 | <10 | 59 | 11 | <10 | <10 | 64 | 68 | 11 |
| 7 | 27 | 454 | 347 | 15 | 45 | <20 | <50 | 20 | 72 | 218 | 14 | 25 | 18 | 343 | 161 | 52 |
| 8 | 37 | 36 | 29 | 40 | 88 | <20 | 137 | 15 | <10 | 180 | 18 | 30 | 20 | 176 | 123 | 60 |

The purpose of the following experiment was to study the effect of a standard caustic iron flotation procedure (standard reagent schedule from O-I operations), followed by a standard ground to −325 mesh and treated on a wet high-gradient magnetic separator. The chemical analyses by XRF methods are presented in Tables 3A, and 3B.

TABLE 3A

| | CONDITIONS | | | REAGENTS, lb/t OF FLOTATION FEED | | | | | |
|---|---|---|---|---|---|---|---|---|---|
| | | SOLIDS | | | | | | | |
| OPERATIONS | MIN. | % | pH | NaOH | WCFA | HF | A-60 | AF-65 | RPM |
| Stage Rod Mill Grind | 9.5 | 50 | | | | | | | 52 |
| Screen at 30 Mesh | | | | | | | | | |
| Deslime at 140 mesh | | | | | | | | | |
| Attrition Scrubbing | 6.0 | 72 | | | | | | | 1500 |
| Desliming at 140 mesh | | | | | | | | | |
| Conditioning + 140 mesh | 4.0 | 68 | 11.1 | 3.65 | 0.91 | | | | 600 |
| Iron Flotation | 2.0 | 26 | 9.4 | | | | | | 1200 |
| Conditioning | 3.0 | 46 | 2.4 | | | 2.51 | 0.91 | 0.035 | 600 |
| Spar Flotation | 2.0 | 22 | 2.8 | | | | | | 1200 |
| Reagent Strengths: | | | | 2.5% | | 2.5% | 2.5% | | |
| c's | | | | 53.2 | | 36.6 | 13.3 | | |
| gr/drop | | | | | 0.0065 | | | 0.0065 | |
| dr's | | | | | 51 | | | 2 | |

TABLE 3B

| PRODUCTS | WEIGHT | | CHEMICAL ANALYSIS | | PERCENT DISTRIBUTION | |
|---|---|---|---|---|---|---|
| | g | % | $Fe_2O_3$ | $Al_2O_3$ % | $Fe_2O_3$ | $Al_2O_3$ |
| Feed (Analyzed) | 950.0 | | 1.47 | 9.00 | | |
| Feed to flotation (calculated) | 977.3 | 100.0 | 1.91 | 8.16 | 100.0 | 100.0 |
| Quartz Product | 366.7 | 37.5 | 0.02 | 0.21 | 0.4 | 1.0 |
| Feldspar - Froth Product | 231.1 | 23.6 | 0.15 | 16.9 | 1.9 | 49.0 |
| Feed to Spar Flotation | (597.8) | (61.2) | (0.07) | (6.66) | (2.2) | (50.0) |
| Fe - Froth Product | 131.1 | 13.4 | 1.88 | 6.94 | 13.2 | 11.4 |
| Feed to Iron Flotation | (728.9) | (74.6) | (0.40) | (6.71) | (15.4) | (61.4) |
| Scrubbing Slimes | 60.9 | 6.2 | 2.57 | 12.30 | 8.4 | 9.4 |
| Plus 30 mesh | 16.4 | 1.7 | 0.12 | 4.42 | 0.1 | 0.9 |
| Grinding Slimes and Losses (calc) | 171.2 | 17.5 | 8.32 | 13.20 | 76.1 | 28.3 |
| Feldspar-Froth Product | 39.48 | 100.0 | 0.15 | | 100.0 | |
| Magnetic, (calc) | 0.29 | 0.7 | 1.50 | | 7.4 | |
| Non-magnetic | 39.19 | 99.3 | 0.14 | | 92.6 | |

Observations:
Weight to Scrubber 1058.4
Weight to Fe Conditioner 1065.7
Weight to Spar Conditioner 1300.8

NaOH = Sodium Hydroxide
WCFA = Pamak WCFA
HF = Hydrofluoric Acid
A-60 = Nottingham A-60 amine
AF-65 = Aerofroth 65

Details of the XRF analysis are shown in Tables 4A and 4B as samples 2 and 3 which corresponds to quartz tail and feldspar froth, respectively.

TABLE 4A

| | WT % | | | | | | | | | | | | |
|---|---|---|---|---|---|---|---|---|---|---|---|---|---|
| SAMPLE | $Na_2O$ | MgO | $Al_2O_3$ | $SiO_2$ | $P_2O_5$ | S | Cl | $K_2O$ | CaO | $TiO_2$ | MnO | $Fe_2O_3$ | BaO |
| 2 | <0.05 | <0.05 | 0.21 | 97.7 | <0.05 | <0.05 | <0.02 | 0.06 | 0.01 | 0.01 | <0.01 | 0.02 | <0.01 |
| 3 | 2.30 | <0.05 | 16.9 | 66.0 | <0.05 | <0.05 | <0.02 | 11.5 | 0.25 | 0.01 | <0.01 | 0.15 | 0.25 |

TABLE 4B

| | PPM | | | | | | | | | | | | | | |
|---|---|---|---|---|---|---|---|---|---|---|---|---|---|---|---|
| SAMPLE | V | Cr | Ni | Cu | Zn | As | Sn | Pb | Mo | Sr | U | Th | Nb | Zr | Rb | Y |
| 2 | <10 | <10 | <10 | <10 | <10 | <20 | <50 | <10 | <10 | 23 | <10 | <10 | <10 | 41 | >10 | <10 |
| 3 | <10 | <10 | <10 | <10 | <10 | <20 | <50 | 45 | <10 | 226 | 30 | 17 | <10 | 48 | 329 | 16 |

The purpose of the following experiment was to study the effect of a standard acid iron flotation procedure (standard reagent schedule from P. W. Gillibrand operations), followed by a standard feldspar flotation procedure (standard reagent schedule from P. W. Gillibrand operations) on the yield and grade of feldspar and sand from the sample. The other portion of the minus 30 plus 140 fractions was conditioned with sulfuric acid and petroleum sulfonate collector, and the iron minerals were removed by froth flotation. The machine discharge product was densified and conditioned with amine and hydrofluoric acid, and the feldspar mineral was removed by froth flotation. All the products from the froth flotation test were collected, filtered, dried and weighed, and a portion was removed by riffle splitting and submitted for chemical analysis by XRF methods. The results of the flotation test are presented in Tables 5A and 5B.

TABLE 5A

| | CONDITIONS | | | | | | | | |
|---|---|---|---|---|---|---|---|---|---|
| | | SOLIDS | | REAGENTS, lb/t OF FLOTATION FEED | | | | | |
| OPERATIONS | MIN. | % | pH | HCl | A-50 | HF | A-60 | AF-65 | RPM |
| Stage Rod Mill Grind | 9.5 | 50 | | | | | | | |
| Screen at 30 Mesh | | | | | | | | | |
| Deslime at 140 mesh | | | | | | | | | |
| Attrition Scrubbing | 5.0 | 72 | | | | | | | 1500 |

TABLE 5A-continued

| | | CONDITIONS | | | REAGENTS, lb/t OF FLOTATION FEED | | | | |
|---|---|---|---|---|---|---|---|---|---|
| | | SOLIDS | | | | | | | |
| OPERATIONS | MIN. | % | pH | HCl | A-50 | HF | A-60 | AF-65 | RPM |
| Desliming at 140 mesh | | | | | | | | | |
| Conditioning + 140 mesh | 4.0 | 70 | 2.0 | 1.84 | 0.92 | | | | 600 |
| Iron Flotation | 1.0 | 25 | 2.6 | | | | | | 1200 |
| Conditioning | 3.0 | 68 | 2.3 | | | 2.54 | 0.92 | 0.036 | 600 |
| Spar Flotation | 2.0 | 25 | 2.9 | | | | | | 1200 |
| Reagent Strengths: | | | | 2.5% | 2.5% | 2.5% | 2.5% | | |
| c's | | | | 26.6 | 13.3 | 36.6 | 13.3 | | |
| gr/drop | | | | | | | | 0.0065 | |
| dr's | | | | | | | | 2 | |

TABLE 5B

| | WEIGHT | | CHEMICAL ANALYSIS | | PERCENT DISTRIBUTION | |
|---|---|---|---|---|---|---|
| PRODUCTS | g | % | $Fe_2O_3$ | $Al_2O_3$ % | $Fe_2O_3$ | $Al_2O_3$ |
| Feed (Analyzed) | 950.0 | | 1.47 | 9.00 | | |
| Feed to flotation (calculated) | 969.6 | 100.0 | 1.93 | 8.47 | 100.0 | 100.0 |
| Quartz Product | 456.0 | 47.0 | 0.21 | 0.88 | 5.1 | 4.9 |
| Feldspar - Froth Product | 245.2 | 25.3 | 0.43 | 17.9 | 5.6 | 53.4 |
| Feed to Spar Flotation | (701.2) | (72.3) | 0.29 | 6.83 | (10.7) | (58.3) |
| Fe - Froth Product | 20.0 | 2.1 | 4.61 | 17.10 | 4.9 | 4.2 |
| Feed to Iron Flotation | (721.2) | (74.4) | 0.41 | 7.12 | (15.6) | (62.5) |
| Scrubbing Slimes | 60.9 | 6.3 | 2.57 | 12.30 | 8.3 | 9.1 |
| Plus 30 mesh | 16.4 | 1.7 | 0.12 | 4.42 | 0.1 | 0.9 |
| Grinding Slimes and Losses (calc) | 171.2 | 17.7 | 8.32 | 13.20 | 75.9 | 27.5 |

Observations: Weight to Scrubber 1058.4
Weight to Fe Conditioner 1026.2
Weight to Spar Conditioner 1035.9

HCl = Hydrochloric Acid
A-50 = Nottingham A-50 petroleum sulfonate
HF = Hydrofluoric Acid
A-60 = Nottingham A-60 amine
AF-65 = Aerofroth 65

Details of the XRF analysis are shown in Tables 6A and 6B as samples 4 and 5 which corresponds to quartz tail and feldspar froth, respectively.

nonmagnetic product was submitted for chemical analysis by XRF methods. The results of the magnetic separation studies are presented in Tables 3A and 3B above.

TABLE 6A

| | WT % | | | | | | | | | | | | |
|---|---|---|---|---|---|---|---|---|---|---|---|---|---|
| SAMPLE | $Na_2O$ | MgO | $Al_2O_3$ | $SiO_2$ | $P_2O_5$ | S | Cl | $K_2O$ | CaO | $TiO_2$ | MnO | $Fe_2O_3$ | BaO |
| 4 | 0.07 | <0.05 | 0.88 | 95.7 | <0.05 | <0.05 | <0.02 | 0.36 | 0.06 | 0.03 | <0.01 | 0.21 | 0.01 |
| 5 | 2.55 | 0.05 | 17.9 | 67.4 | <0.05 | <0.05 | <0.02 | 11.7 | 0.32 | 0.09 | <0.01 | 0.43 | 0.26 |

TABLE 6B

| | PPM | | | | | | | | | | | | | | |
|---|---|---|---|---|---|---|---|---|---|---|---|---|---|---|---|
| SAMPLE | V | Cr | Ni | Cu | Zn | As | Sn | Pb | Mo | Sr | U | Th | Nb | Zr | Rb | Y |
| 4 | <10 | <10 | <10 | <10 | <10 | <20 | <50 | <10 | <10 | 40 | <10 | <10 | <10 | 42 | <10 | <10 |
| 5 | <10 | <10 | <10 | <10 | <10 | 21 | <50 | 47 | <10 | 243 | 21 | 25 | <10 | 96 | 334 | 26 |

A portion of the feldspar flotation froth was ground in a porcelain ball mill to pass 325 mesh and passed through a high-gradient wet magnetic separator at the highest field settings, using steel wool as the collection matrix. The products were collected, dried, and weighed. The final It is evident that the raw material contains a significant amount of mixed feldspar minerals. The sample also contains a high iron mineral content. Additionally, some of the iron in the sample is included into the structure of the feldspar minerals. Grinding and attrition scrubbing of the sample rejected almost 24% of the feed materials as minus 140 mesh slime. The iron flotation with fatty acid removed an additional 13 weight percent of the feed. Of the remaining 61 weight percent of the feed, 37.5 weight percent was recovered as quartz with an iron content of 0.02% $Fe_2O_3$, and only 23.6 weight percent of the feed was recovered as a feldspar product with an iron content of 0.15 % $Fe_2O_3$. Aside from the iron content of the feldspar froth product, the total alkali and alumina contents were within the acceptable range for marketable feldspar for the glass and ceramic industries. Fine grinding and wet high-gradient magnetic separation failed to reduce the iron content of the feldspar flotation product.

Examination of the chemistry of the feldspar flotation product shows that the material is composed primarily of potassium feldspar, with small amounts of soda feldspar and only trace amounts of calcium and barium feldspar. Examination of the chemistry of the quartz product, from Table 513, showed that the material is nearly pure quartz with a $Si_2$ content (by difference) of 99.6%.

EXAMPLE 3

A series of flotation tests were performed to determine the effectiveness of various depressants in separating silica from feldspar minerals. The objectives of the test were to produce a silica product containing less than 1.75 wt. % $Al_2O_3$ and that is substantially free of fluroine, whether compounded or non-compounded. A representative sample of a ground and deslimed ore sample was submitted for XRF analysis. The sample assayed 7.75% $Al_2O_3$, 0.43% Fe, 4.82% $K_2O$, 1.15% $Na_2O$ and 86.3% $SiO_2$.

A total of seven flotation tests were performed on the ground and deslimed ore sample. Preceding each flotation test the ore was attrition scrubbed in the flotation cell at high solids and agitation. The ore was then deslimed at 100 mesh (U.S.). Typically, the weight lost after scrubbing was 2–5% of the flotation feed.

A highly effective approach for producing silica concentrate with <1.75% $Al_2O_3$ was by using CaO for pH adjustment between 8.5 and 9 and floating with NOTTINGHAM A-60, fatty acid amine in the rougher flotation stage. Cleaning the rougher concentrate was achieved by adjusting the ph to 5 with sulfuric acid and then adding CaO to pH 8.5–9 and floating with stage addition of A-60 while maintaining continuously the pH >8.5 with CaO.

Individual test objectives and discussion of results obtained for each test are set forth below. Flotation material balances were performed using silica concentrate and machine discharge assays and calculated cleaner tailing assay (balanced against the assayed head).

Flotation Test BM-1

The objective of this test was to evaluate NOTTINGHAM A-60 (Monoacetate fatty amine) at pH >8.3 as a collector for silica from the ore sample. The collector dosage was maintained at 0.25 lb./ton. The products from this test were not submitted for analysis due to the very low yield.

Flotation Test BM-2

The test objective was to repeat BM-1 using stage addition of the A-60 collector. The pH of the flotation stages was maintained continuously above 8.4 with CaO. The test results indicate that the silica yield from rougher flotation was >50 percent; however, the grade of the cleaner concentrate was 2.47% $Al_2O_3$. Therefore, an increased selectivity was needed in the cleaner stage.

Flotation Test BM-3

The objective of this test was to evaluate the use of a cationic/anionic collector scheme to increase the selectivity of the silica float. The pulp was conditioned ferric chloride and calcium chloride at ph 4.5 prior to flotation with PAMAK 4 (fatty acid) (an cationic collector). This was followed by a second stage of rougher flotation using A-60 (an anionic collector) for a silica collector. Cleaning the rougher concentrate by flotation was performed using only the A-60 collector. The combination of PAMAK 4 (a cationic collector) and low pH did not produce an activated mineral for collection. Silica did not begin to float until the pH was raised over 8.5 in the presence of A-60.

Nearly 40% silica yield was achieved in the cleaner float at a grade of 2.36% $Al_2O_3$. The results were encouraging and gave light to the effectiveness of gypsum coating the feldspar mineral surfaces.

Flotation Test BM-4

Based on the results obtained in BM-3 this test was designed to evaluate the effect of high pH on the flotation of silica. This test was performed at pH 10.3 with stage addition of A-60 collector and MIBC as the frother. The rougher flotation yield of silica was nearly 47% and cleaner flotation yield of 36% at a grade of 1.56% $Al_2O_3$. The cleaner flotation stage was performed with stage-addition of A-60 collector as well. The results were the best achieved to date and show the strong association of pH and stage-addition of collector.

Flotation Test BM-5

The test objective was to determine if the addition of an additional collector, MORCO M-70 petroleum sulfonate (i.e., a anionic collector), would be beneficial in improving the product yield and grade. Initial flotation was performed at pH 2.5 using sulfuric acid and M-70. There were not any minerals activated at this pH with this collector, so CaO was added to pH 9 and A-60 was stage-added resulting in silica yield of 66.5% in the rougher concentrate. Cleaner flotation was then performed identical to BM-4. The results achieved, though not as good as those achieved in BM-4, however, were encouraging, due to the increased silica yield.

Flotation Test BM-6

The test objective was to enhance the formation of gypsum coatings on the feldspar minerals by using a sulfuric acid conditioning stage prior to CaO addition. The rougher flotation and cleaner flotation stages were performed at pH >8.4 with stage-addition of A-60 collector. The results indicate that over 55% silica yield was achieved in the rougher flotation stage. The cleaner flotation grade was only 1.53% $Al_2O_3$ at a yield of 24.4%. Based on visual observations the product yield could be enhanced by prolonged flotation time. Material balance labeled BM-6a depicts the balance using assays from all products. This balance shows that the grade of the cleaner tailing is only 4% $Al_2O_3$, indicating the potential of increasing silica product yield to be very good. This test can also be considered a confirmatory test for BM-4.

Flotation Test BM-7

The objective of this test was to evaluate the potential of CYTEC ACCO 950 as a depressant for feldspar minerals. The rougher flotation test conditions were similar to those of BM-6, with the addition of ACCO-950. There was not a significant decrease in the floatability of the feldspar minerals with the addition of the depressant. The silica rougher flotation concentrate was visibly polluted with feldspar and was not submitted for analysis. The rougher flotation weight recovery was over 60%, indicating poor selectivity.

Based on test results obtained in the flotation testing of the ore sample, the most promising procedure for generating a <1.75% $Al_2O_3$ silica product will be by stage addition of amine collector with pH >8.4 using CaO. The flotation response is very sensitive to these operating parameters. Operation at pH levels higher than 9 were not detrimental but will probably increase the collector addition requirement. Stage-addition of the amine collector should be done at dosages not greater than 0.05 lb./t at each stage to prevent feldspar activation.

Two of the above-noted flotation test, namely tests BM-4 and BM-6, produced a satisfactory silica product. Both tests added CaO at pH values between 8.4 and 9.0. It is believed that the formation of gypsum on the feldspar mineral surfaces and $Ca^{2+}$ ions are the active agents. Stage-addition of the fatty acid amine collector is important in minimizing feldspar conamination of the silica product.

Based on the test results, the proposed flotation scheme to generate silica with the desired product quality is: Rougher flotation of the silica at about 8.4–9.0 adjusted with lime, addition of about 0.1 lb./ton fatty acid amine (NOTTINGHAM A-60) using MIBC as a frother. The flotation froth will become barren with the depletion of collector, indicating the need to add an additional 0.025 lb./ton. Continue stage-adding the collector, modifying the pH as necessary, until the characteristic pink coloration of feldspar dominates the flotation froth. Total flotation time in the laboratory is 7–9 minutes. The machine discharge is the feldspar product and can be sent to filtration. Cleaning of the flotation concentrate can be achieved by adjusting the pH of the slurry with sulfuric acid to about pH 5, then raise the pH to about pH 9.0 using CaO. Flotation is then performed with stage-addition of the collector and CaO as necessary, and MIBC as a frother.

Additional testing should concentrate on the effect of gypsum coating of the feldspar minerals in the cleaner circuit. This would decrease reagent consumption and improve product yield.

TABLE 7A

TEST BM-2
BACCULITE MESA FELDSPAR FLOTATION

| Product | Wt | $Al_2O_3$ | $Fe_2O_3$ | $K_2O$ | $Na_2O$ | $SiO_2$ |
|---|---|---|---|---|---|---|
| ASSAY, % | | | | | | |
| SiO2 | 168.1 | 2.51 | 0.02 | 1.51 | 0.33 | 96 |
| SPAR | 232.1 | 11.1 | 0.1 | 7.15 | 1.54 | 80.2 |
| Cl Tail | 147.4 | 8.45 | 1.42 | 4.93 | 1.47 | 84.84 |
| TOTAL | 547.6 | | | | | |
| HEAD | 547.6 | 7.75 | 0.43 | 4.82 | 1.15 | 86.3 |
| CONTENT, % | | | | | | |
| SiO2 | 168.1 | 421.931 | 3.362 | 253.831 | 55.473 | 16137.6 |
| SPAR | 232.1 | 2576.31 | 23.21 | 1659.52 | 357.434 | 18614.4 |
| Cl Tail | 147.4 | 1245.66 | 208.896 | 726.086 | 216.833 | 12505.9 |
| TOTAL | 547.6 | 4243.9 | 235.468 | 2639.43 | 629.74 | 47257.9 |
| HEAD | 547.6 | | | | | |
| DISTRIBUTION, % | | | | | | |
| SiO2 | 30.70 | 9.94 | 1.43 | 9.62 | 8.81 | 34.15 |
| SPAR | 42.38 | 60.71 | 9.86 | 62.87 | 56.76 | 39.39 |
| Cl Tail | 26.92 | 29.35 | 88.72 | 27.51 | 34.43 | 26.46 |
| TOTAL | 100.00 | 100.00 | 100.00 | 100.00 | 100.00 | 100.00 |

TABLE 7B

TEST BM-3
BACCULITE MESA FELDSPAR FLOTATION

| Product | Wt | $Al_2O_3$ | $Fe_2O_3$ | $K_2O$ | $Na_2O$ | $SiO_2$ |
|---|---|---|---|---|---|---|
| ASSAY, % | | | | | | |
| SiO2 | 217.9 | 2.36 | 0.02 | 1.49 | 0.28 | 96.2 |
| SPAR | 184.8 | 11.9 | 0.13 | 7.73 | 1.65 | 78.7 |
| Cl Tail | 147.8 | 10.51 | 1.41 | 6.09 | 1.81 | 81.21 |
| TOTAL | 550.5 | | | | | |
| HEAD | 550.5 | 7.75 | 0.43 | 4.82 | 1.15 | 86.3 |
| CONTENT, % | | | | | | |
| SiO2 | 168.1 | 514.244 | 4.358 | 324.671 | 61.012 | 20962 |
| SPAR | 232.1 | 2199.12 | 24.024 | 1428.5 | 304.92 | 14543.8 |
| Cl Tail | 147.4 | 1553.01 | 208.333 | 900.235 | 267.143 | 12002.4 |
| TOTAL | 547.6 | 4266.38 | 236.715 | 2653.41 | 633.075 | 47508.2 |
| HEAD | 547.6 | | | | | |
| DISTRIBUTION, % | | | | | | |
| SiO2 | 39.58 | 12.05 | 1.84 | 12.242 | 9.64 | 44.12 |
| SPAR | 33.57 | 51.55 | 10.15 | 53.84 | 48.16 | 30.61 |
| Cl Tail | 26.85 | 36.40 | 88.01 | 33.93 | 42.20 | 25.26 |
| TOTAL | 100.0 | 100.0 | 100.0 | 100.0 | 100.0 | 100.0 |

TABLE 7C

TEST BM-4
BACCULITE MESA FELDSPAR FLOTATION

| Product | Wt | $Al_2O_3$ | $Fe_2O_3$ | $K_2O$ | $Na_2O$ | $SiO_2$ |
|---|---|---|---|---|---|---|
| ASSAY, % | | | | | | |
| SiO2 | 169.1 | 1.56 | 0.02 | 0.98 | 0.18 | 97.5 |
| SPAR | 257.2 | 9.31 | 0.09 | 5.93 | 1.34 | 83.4 |
| Cl Tail | 48.6 | 21.03 | 3.66 | 12.31 | 3.52 | 62.68 |
| TOTAL | 474.9 | | | | | |
| HEAD | 474.9 | 7.75 | 0.43 | 4.82 | 1.15 | 86.3 |
| CONTENT, % | | | | | | |
| SiO2 | 168.1 | 263.796 | 3.382 | 165.718 | 30.438 | 16487.3 |
| SPAR | 232.1 | 2394.53 | 23.148 | 1525.2 | 344.648 | 21450.5 |
| Cl Tail | 147.4 | 1022.15 | 177.67 | 598.104 | 171.049 | 3046.14 |
| TOTAL | 547.6 | 3680.48 | 204.207 | 2289.02 | 546.135 | 40983.9 |
| HEAD | 547.6 | | | | | |
| DISTRIBUTION, % | | | | | | |
| SiO2 | 35.61 | 7.17 | 1.66 | 7.24 | 5.57 | 40.23 |
| SPAR | 54.16 | 65.06 | 11.34 | 66.63 | 63.11 | 52.34 |
| Cl Tail | 10.23 | 27.77 | 87.01 | 26.13 | 31.32 | 7.43 |
| TOTAL | 100.0 | 100.0 | 100.0 | 100.0 | 100.0 | 100.0 |

TABLE 7D

TEST BM-5
BACCULITE MESA FELDSPAR FLOTATION

| Product | Wt | $Al_2O_3$ | $Fe_2O_3$ | $K_2O$ | $Na_2O$ | $SiO_2$ |
|---|---|---|---|---|---|---|
| ASSAY, % | | | | | | |
| SiO2 | 194.7 | 2.56 | 0.02 | 1.6 | 0.34 | 95.4 |
| SPAR | 157.2 | 12 | 0.1 | 7.84 | 1.73 | 78.5 |

TABLE 7D-continued

TEST BM-5
BACCULITE MESA FELDSPAR FLOTATION

| Product | Wt | Al$_2$O$_3$ | Fe$_2$O$_3$ | K$_2$O | Na$_2$O | SiO$_2$ |
|---|---|---|---|---|---|---|
| Cl Tail | 118.2 | 10.65 | 1.54 | 6.11 | 1.71 | 81.68 |
| TOTAL | 470.1 | | | | | |
| HEAD | 550.5 | 7.75 | 0.43 | 4.82 | 1.15 | 86.3 |
| CONTENT, % | | | | | | |
| SiO2 | 168.1 | 498.432 | 3.894 | 311.52 | 66.198 | 18574.4 |
| SPAR | 232.1 | 1886.4 | 15.72 | 1232.45 | 271.956 | 12340.2 |
| Cl Tail | 147.4 | 1258.44 | 182.529 | 721.914 | 202.461 | 9655.05 |
| TOTAL | 547.6 | 3643.28 | 202.143 | 2265.88 | 540.615 | 40569.6 |
| HEAD | 547.6 | | | | | |
| DISTRIBUTION, % | | | | | | |
| SiO2 | 41.42 | 13.68 | 1.93 | 13.75 | 12.24 | 45.78 |
| SPAR | 33.44 | 51.78 | 7.78 | 54.39 | 50.30 | 30.42 |
| Cl Tail | 25.14 | 34.54 | 90.30 | 31.86 | 37.45 | 23.80 |
| TOTAL | 100.0 | 100.0 | 100.0 | 100.0 | 100.0 | 100.0 |

TABLE 7E

TEST BM-6
BACCULITE MESA FELDSPAR FLOTATION

| Product | Wt | Al$_2$O$_3$ | Fe$_2$O$_3$ | K$_2$O | Na$_2$O | SiO$_2$ |
|---|---|---|---|---|---|---|
| ASSAY, % | | | | | | |
| SiO2 | 115 | 1.53 | 0.01 | 0.96 | 0.18 | 97.1 |
| SPAR | 198.1 | 9.31 | 0.07 | 5.98 | 1.35 | 83.4 |
| Cl Tail | 159.2 | 10.30 | 1.18 | 6.16 | 1.60 | 82.11 |
| TOTAL | 472.3 | | | | | |
| HEAD | 472.3 | 7.75 | 0.43 | 4.82 | 1.15 | 86.3 |
| CONTENT, % | | | | | | |
| SiO2 | 168.1 | 175.95 | 1.15 | 110.4 | 20.7 | 11166.5 |
| SPAR | 232.1 | 1844.31 | 13.867 | 1184.64 | 267.435 | 16521.5 |
| Cl Tail | 147.4 | 1640.06 | 188.072 | 981.448 | 255.01 | 13071.5 |
| TOTAL | 547.6 | 3660.33 | 203.089 | 2276.49 | 543.15 | 40759.5 |
| HEAD | 547.6 | | | | | |
| DISTRIBUTION, % | | | | | | |
| SiO2 | 24.35 | 4.81 | 0.57 | 4.85 | 3.81 | 27.40 |
| SPAR | 41.94 | 50.39 | 6.83 | 52.04 | 49.24 | 40.53 |
| Cl Tail | 33.71 | 44.81 | 92.61 | 43.11 | 46.95 | 32.07 |
| TOTAL | 100.0 | 100.0 | 100.0 | 100.0 | 100.0 | 100.0 |

TABLE 7F

TEST BM-6a
BACCULITE MESA FELDSPAR FLOTATION

| Product | Wt | Al$_2$O$_3$ | Fe$_2$O$_3$ | K$_2$O | Na$_2$O | SiO$_2$ |
|---|---|---|---|---|---|---|
| ASSAY, % | | | | | | |
| SiO2 | 115 | 1.53 | 0.01 | 0.96 | 0.18 | 97.1 |
| SPAR | 198.1 | 9.31 | 0.07 | 5.98 | 1.35 | 83.4 |
| Cl Tail | 159.2 | 4.00 | 0.03 | 2.55 | 0.59 | 93.00 |
| TOTAL | 472.3 | | | | | |
| HEAD | 472.3 | 7.75 | 0.43 | 4.82 | 1.15 | 86.3 |
| CONTENT, % | | | | | | |
| SiO2 | 168.1 | 175.95 | 1.15 | 110.4 | 20.7 | 11166.5 |

TABLE 7F-continued

TEST BM-6a
BACCULITE MESA FELDSPAR FLOTATION

| Product | Wt | Al$_2$O$_3$ | Fe$_2$O$_3$ | K$_2$O | Na$_2$O | SiO$_2$ |
|---|---|---|---|---|---|---|
| SPAR | 232.1 | 1844.31 | 13.867 | 1184.64 | 267.435 | 16521.5 |
| Cl Tail | 147.4 | 1640.06 | 188.072 | 981.448 | 255.01 | 13071.5 |
| TOTAL | 547.6 | 3660.33 | 203.089 | 2276.49 | 543.145 | 40759.5 |
| HEAD | 547.6 | | | | | |
| DISTRIBUTION, % | | | | | | |
| SiO2 | 24.35 | 4.81 | 0.57 | 4.85 | 3.81 | 27.40 |
| SPAR | 41.94 | 50.39 | 6.83 | 52.04 | 49.24 | 40.53 |
| Cl Tail | 33.71 | 44.81 | 92.61 | 43.11 | 46.95 | 32.07 |
| TOTAL | 100.0 | 100.0 | 100.0 | 100.0 | 100.0 | 100.0 |

While various embodiments of the present invention have been described in detail, it is apparent the modifications and adaptations of those embodiments will occur to those skilled in the art. However, it is to be expressly understood that such modifications and adaptations are within the scope of the present invention, as set forth in the following claims.

What is claimed is:

1. A process for treating a feed material comprising silica and feldspar to form a feldspar product for use in making glass, the silica being a different mineral than feldspar, comprising:

floating a slurry including the feed material in the presence of a depressant that renders the feldspar substantially polar to form a concentrate fraction comprising at least most of the silica in the feed material and a tailings fraction comprising at least most of the feldspar in the feed material.

2. The process of claim 1, wherein the feed material has a P$_{80}$ size ranging from about 30 mesh (U.S.) to about 140 mesh (U.S.).

3. The process of claim 1, wherein the depressant comprises a metal that is selected from the group consisting of calcium, magnesium, barium, strontium, beryllium, and mixtures thereof.

4. The process of claim 1, wherein the amount of depressant used in the floating step ranges from about 0.10 to about 2 kg/tonne of feed material.

5. The process of claim 1, wherein the feed material is in form of a slurry and the slurry has a pH ranging from about pH 8.2 to about pH 9.

6. The process of claim 1, wherein the floating step is performed in the presence of a collector that is an amine.

7. The process of claim 6, wherein the amount of collector used in the floating step ranges from about 0.05 to about 0.20 kg/tonne of feed material.

8. The process of claim 1, wherein the floating step occurs in the presence of a long-chained alcohol.

9. The process of claim 8, wherein the amount of the long-chained alcohol used in the floating step ranges about 0.1 to about 0.5 kg/tonne of feed material.

10. The process of claim 1, wherein at least one of the concentrate and tailings fractions includes magnetic impurities and further comprising:

drying the at least one of the concentrate and tailings fractions to form a dried fraction and passing the dried fraction through a magnetic field to form a magnetic concentrate fraction including at least most of the silica and feldspar in the at least one of the concentrate and tailings fractions and a magnetic waste material including at least most of the magnetic impurities.

11. The process of claim 10, further comprising before the passing step:
  passing the dried fraction through an electric field to impart an electrical charge to the particles in the dried fraction.

12. The process of claim 10, wherein the magnetic field has a strength of at least about 18,000 gauss.

13. The process of claim 12, further comprising before the passing step:
  subjecting the dried fraction to a weak magnetic field having a strength of nor more than about 8000 gauss.

14. The process of claim 10, wherein the magnetic field has a strength of no more than about 50000 gauss.

15. The process of claim 10 wherein the magnetic field has a strength of from about 20000 gauss to about 30000 gauss.

16. A process for converting a feed material comprising silica and feldspar into a feldspar product for forming glass, the silica having a different chemical composition than the feldspar, comprising floating the feed material in the presence of a depressant to depress the flotation of the feldspar and form a concentrate fraction containing at least most of the silica in the feed material and a tailings fraction containing at least most of the feldspar.

17. The process of claim 16, wherein, during flotation, the concentrate fraction is located in a froth region of a flotation cell and the tailings fraction is located in a bottom region of the flotation cell.

18. The process of claim 16, wherein the depressant includes a metal selected from the group consisting of calcium, magnesium, barium, strontium, beryllium and mixtures thereof.

19. The process of claim 14, wherein the feed material includes a magnetic impurity and further comprising:
  drying at least one of the concentrate and tailings fractions to form a dried material and
  passing the dried material through a magnetic field to remove at least a portion of the magnetic impurity.

20. The process of claim 19, further comprising passing the dried material through an ionization or electrostatic field before the passing step.

21. The process of claim 16, wherein the depressant is a sulfate.

22. The process of claim 16, wherein the depressant is selected from the group consisting of lime, calcium hydroxide, gypsum, and mixtures thereof.

23. The process of claim 16, wherein the feed material is in a slurry and the pH of the slurry in the floating step ranges from about pH 8.2 to about pH 9.

24. The process of claim 16, wherein the floating step includes the steps of:
  contacting the feed material with a sulfate source; and
  contacting the feed material with a calcium source to form calcium sulfate.

25. The process of claim 16, wherein in the floating step the depressant is lime, calcium hydroxide, gypsum, or mixtures thereof and the pH of a slurry containing the feed material ranges from about pH 8.2 to about pH 9 and further comprising:
  further floating the concentrate fraction in a cleaner circuit, wherein the further floating step includes contacting the concentrate fraction with sulfuric acid to lower the pH of a slurry containing the concentrate fraction to about pH 6 or less and thereafter contacting the concentrate with calcium oxide to form gypsum and raise the pH of the concentrate fraction to a pH ranging from about pH ranging from about pH 8.5 to about pH 9.

26. A process for treating a feed material comprising silica, feldspar, and metal impurities including at least one of mica, iron impurities, or refractory heavy minerals for use in making glass comprising:
  floating the feed material in the presence of a feldspar depressant at a pH ranging from about pH 8.2 to about pH 9 to substantially depress the floatation of the feldspar and thereby form a concentrate fraction comprising at least most of the silica and a tailings fraction comprising at least most of the feldspar; and
  passing at least a portion of the feed material through a magnetic field to produce a magnetic concentrate fraction and a magnetic tailing fraction comprising at least most of the metal impurities in the feed material.

27. The process of any one of claims 1, 3, 4, 5, 10, 11, 12, 13, or 14, wherein the silica is at least one of chalcedony, chert, coesite, cristobalite, flint, and quartz.

28. The process of any one of claims 1, 3, 4, 5, 10, 11, 12, 14, or 15, wherein the feldspar is at least one of orthoclase, hyalophane, celsian, microcline, anorthoclase, and plagioclase.

29. The process of any one of claims 16, 18, 19, or 22, 23, 24, wherein the silica is selected from the group consisting of chalcedony, chert, coesite, cristobalite, flint, quartz, and mixtures thereof.

30. The process of any one of claims 16, 18, 19, or 22, 23, 24, wherein the feldspar is selected from the group consisting of orthoclase, hyalophane, celsian, microcline, anorthoclase, plagioclase and mixtures thereof.

* * * * *